April 5, 1927.
A. A. KRAMER
1,623,122
LIQUID LEVEL INDICATOR
Filed Jan. 5, 1926   2 Sheets-Sheet 1
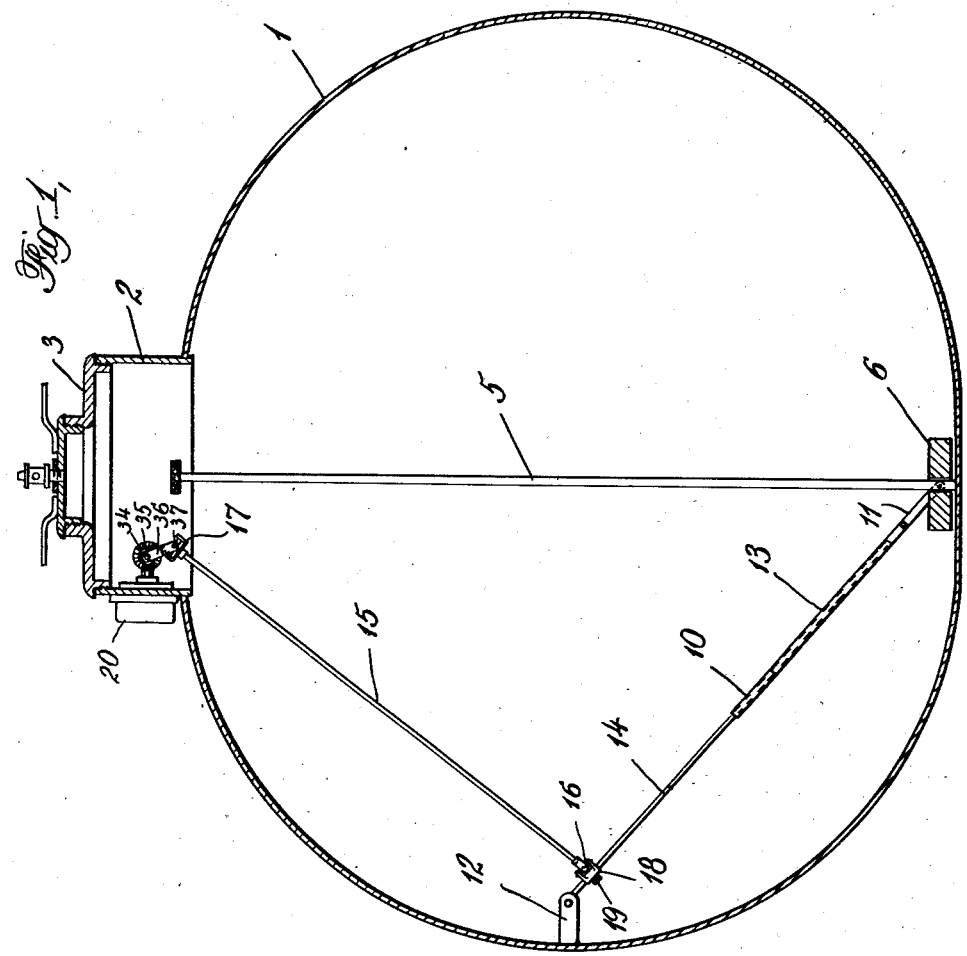
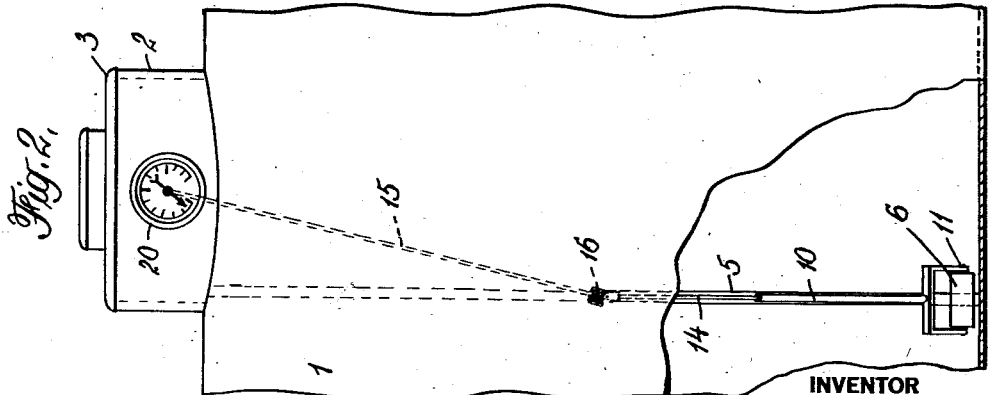
INVENTOR
Andrew A. Kramer
BY
ATTORNEYS

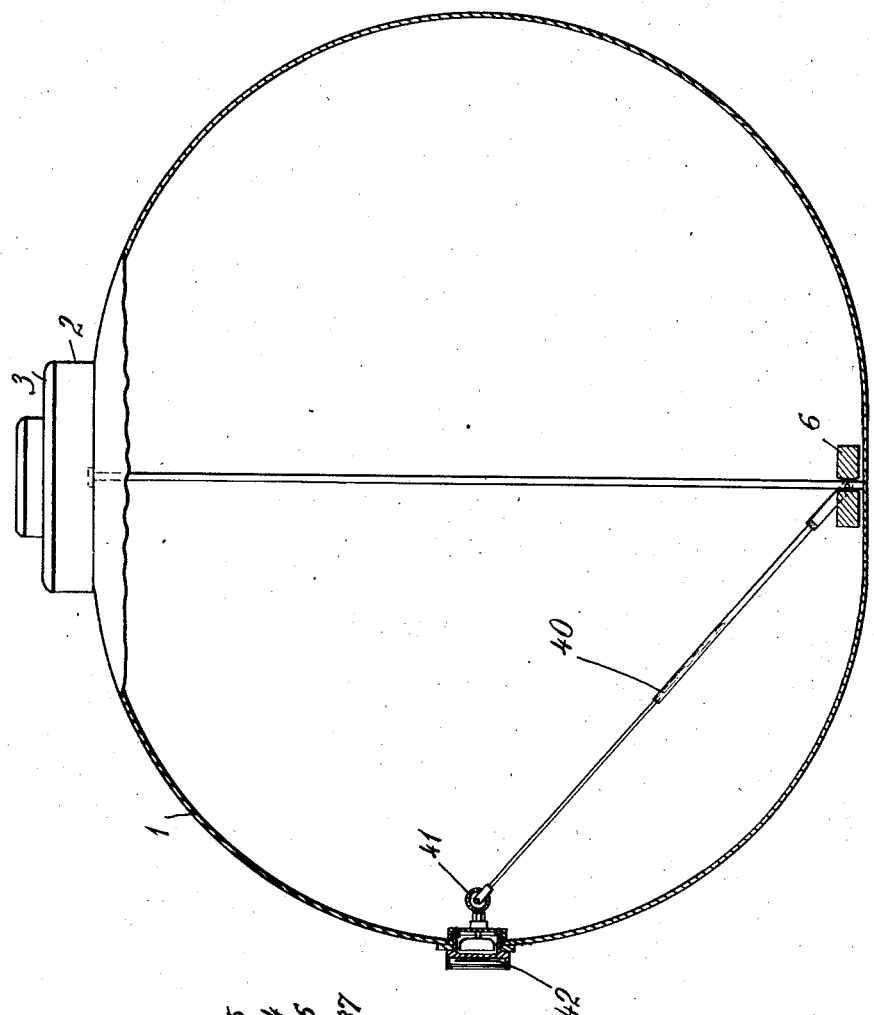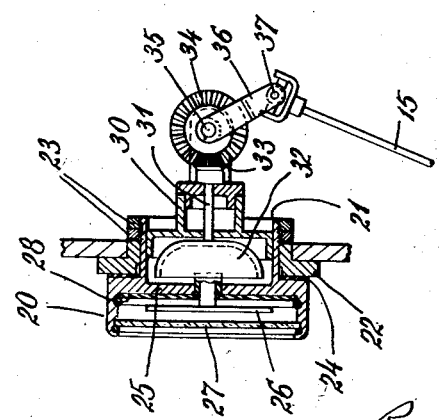

Patented Apr. 5, 1927.

1,623,122

UNITED STATES PATENT OFFICE.

ANDREW A. KRAMER, OF KANSAS CITY, MISSOURI.

LIQUID-LEVEL INDICATOR.

Application filed January 5, 1926. Serial No. 79,281.

This invention relates to liquid level indicators, and has to do particularly with the provision of an indicator adapted to be used, primarily, with tanks mounted upon vehicles for operation over roadways, such as for instance truck tanks used for distributing gasoline from place to place.

A vehicle which operates over roads is subjected to impacts and jolts caused by rough and uneven places in the roads, and in the case of a truck tank carrying gasoline, or other liquid, the impacts and jolts to which the tank is subjected causes a surging of the liquid within the tank. Surging of the liquid causes undue movement of the float of the liquid level indicator which rides upon the surface of the liquid, and ofttimes the movement is so violent as to cause damage to the mechanism of the level indicator with the result that the level of the liquid within the tank is not accurately indicated, or the damage may be of such a nature as to render the indicator entirely inoperative. When the truck tank is on a grade the tank assumes a position at an angle to the horizontal, and there is a rising of the gasoline in one end of the tank, and a lowering of the gasoline in the other end of the tank and the correct level of the gasoline is not indicated by the liquid level indicator. This condition might occur when gasoline is being delivered from the tank to a filling station for automobiles, at which time it is desirable that the level of the liquid within the tank be accurately indicated, by reason of the ground upon which the truck tank is standing at the time of delivery not being level. Many times the truck tank is required to stand in the highways while the gasoline is being delivered, and as many of the highways have a crowned surface the truck stands at an angle to the horizontal and the level of the gasoline is not properly indicated.

The present invention involves the provision of a liquid level indicator which overcomes the objections to indicators heretofore used, and which is so constructed that its operativeness will not be impaired by the surging of the liquid in the tank, and in which the float which is sustained by the liquid is positioned within the tank so that inaccurate indication of the level of the liquid, when the tank is at an angle to the horizontal will, in a large measure, be prevented. The present invention also aims to provide a liquid level indicator which is easily installed within the tank, and in which the operating mechanisms are adjustable so that the indicator can be readily adapted for use with tanks of various sizes and of various diameters.

The embodiment of the invention which I prefer to employ consists of a float which is sustained by the liquid, and which is connected by suitable mechanism to a rotatable magnet which acts upon an independently mounted pointer operating over a dial and visible from the outside of the tank, so that the position of the float within the tank is indicated by the pointer. The float is positioned centrally of the tank and has a movement from the bottom to the top of the tank, and a guide rod is secured in the central part of the tank for guiding and bracing the float throughout its entire length of movement, thus preventing in a large measure, undue movement of the float upon the surge of the liquid within the tank. By placing the guide rod and the float in a central portion of the tank, improper indication of the liquid level, when the truck is standing at an angle is in a large measure prevented. The mechanism connecting the float with the rotatable magnet consists of a suitable system of levers so constructed that the magnet and pointer may be placed in any selected position in the tank, regardless of the central position of the float, and the levers are arranged for adjustment relative to each other so that the movement of the pointer relative to the movement of the float is adjustable, and in this way the device is readily adaptable for use with tanks of different sizes and of different diameters.

The invention includes various novel features of construction which will be made clear upon reference to the accompanying drawings in which the new device is shown in its preferred embodiment. In the accompanying drawings:

Fig. 1 is a sectional view through a tank showing the level indicator; Fig. 2 is a view taken at right angles to Fig. 1 with parts cut away, and showing the offset relation of the float and the indicator head; Fig. 3 is a section through a tank showing a modified form; and Fig. 4 is an enlarged sectional view of the indicator head.

Referring to the drawings a tank of any desired construction or form is shown at 1 which tank may be provided with a filler opening 2 having a closure 3. Positioned centrally of the tank and fastened to the bottom wall and top wall of the tank is a rod 5 which guides the float 6 in its movement as determined by the level of the liquid within the tank. A telescoping arm 10 is pivoted to the float 6 as by means of the forked member 11, and is pivoted, at its opposite end to a projection 12, which projection is secured to the side wall of the tank 1. The telescoping member may consist of a tubular member 13 and a rod 14 in sliding relation to accommodate the varying distances between the projection 12 and the float 6 as the float moves up and down upon the guide rod 5. A connecting rod 15 joins the telescoping arm 10 with the indicator proper. The rod 15 is provided with universal joints 16 and 17 and has a sleeve 18 adapted to be positioned at any desired point upon the telescoping arm 10 and maintained in that position by a set screw 19. The construction of the rod 15, including the universal joints 16 and 17, affords the positioning of the indicator in any desired position of the tank. In Figs. 1 and 2 wherein is shown the device with the indicator mounted in the wall of the filler opening, and the guide rod and float positioned to one side of the filler opening, the rod 15 accommodates the offset relation of the float and indicator. By adusting the sleeve 18, along the rod 14, the movement of the crank 36 of the indicator can be made greater or less as desired, to regulate the movement of the pointer relative to the movement of the float. This construction makes the device readily adaptable to tanks of various sizes and of various diameters, so that in the manufacture of the indicators one standard size only need be made, and which standard size can be used with tanks of any of the varying sizes or diameters.

The indicator which is mounted either in the side wall of the tank or in the side wall of the filler opening consists of a housing 20 which lies to the exterior of the tank and has an extension 21 which extends through the side wall. In securing the indicator in the wall a bushing 22 may be secured in the opening of the wall and the projection 21 of the housing 20 inserted therethrough. The projection 21 may have nuts 23 screwed thereon to maintain the housing 20 in the wall and a suitable washer 24 may be placed between the exterior part of the housing 20 and the bushing to make a liquid tight joint. The housing 20 is provided with a partition 25 which seals the inner part of the housing from the outer part. In the outer part of the housing is a pointer 26 mounted for rotary movement and visible from the outside of the tank through a transparent cover 27. To the rear of the pointer 26 is a dial 28 provided with suitable indicia over which the dial operates. A frame as shown at 30 is mounted within the extension 21, and extends within the tank. This frame 30 supports a shaft 31 mounted for rotary movement and the shaft 31 has at one end thereof a magnet 32 and at the opposite end thereof a pinion 33, the teeth of which pinion mesh with the teeth of the bevel gear 34. The bevel gear 34 is mounted on the shaft 35 which shaft carries a crank arm 36, which is connected to the rod 15 by a universal joint as shown at 37.

As the float moves along the guide rod 5 the telescoping arm and the connecting rod 15 operate to move the crank 36 of the indicator. This movement of the crank 36 causes a movement of the bevel gear 34 which in turn causes a rotary movement of the magnet 32 through the shaft 31 of pinion 33. The magnet acts upon the pointer 26, and movement of the magnet causes like movement of the pointer over the dial 28 and the position of the float within the tank is thus indicated.

In Fig. 3 is shown a modified form of my invention and in this form the indicator is mounted in the side wall of the tank instead of the wall of the filler opening. In this form the telescoping arm 40 is connected directly to the bevel gear 41 so that movement of the float moves the bevel gear and causes a rotary movement of the pointer 42 through the mechanism of the indicator as above described.

It will be understood that the various details of construction in the embodiment of the invention as herein described, and shown in the accompanying drawings, may be changed without departing from the invention.

I claim:

1. In a liquid level indicator for tanks, a float, a guide rod extending from the center point of the bottom through the center of the tank upwardly to a point adjacent the top thereof, said guide rod being adapted to direct the movement of the float, a bracket supported by the tank and arranged in spaced relation to said guide rod, an arm comprising two telescopically connected members, pivoted at one end to said bracket, the other end of said arm being attached to the float, a second arm having a universal connection at one end thereof, by which said arm is joined to the first mentioned arm at a point adjacent its pivoted end, and means associated therewith for indicating the position of the float in the tank.

2. In a liquid level indicator for tanks, a float, a guide rod extending from the center point of the bottom through the center of the tank upwardly to a point adjacent the top thereof, said guide rod being adapted to direct the movement of the float, a bracket supported by the tank and spaced from said guide rod, an arm comprising two telescopically connected members pivoted at one end to said bracket, the other end of the arm being connected to the float, an indicator having a pointer, and means having a universal connection at one end thereof and being associated with said arm through said universal connection, for transforming the lineal motion of the float into a rotary motion of the pointer.

3. In a liquid level indicator for tanks, a float, a guide rod extending from the center point of the bottom through the center of the tank vertically upwardly to a point adjacent the top thereof, said guide rod being adapted to direct the movement of the float, a bracket secured to the side wall of the tank, and an arm comprising two members telescopically engaging each other, pivoted at one end to said bracket, the other end of said arm being connected to the float, a second arm adjustably connected to the telescoping arm adjacent the pivoted end of the latter, being adapted to move angularly with respect to the plane in which the telescoping arm moves, a dial and an indicating pointer, said second arm being provided with means for causing movement of the pointer, whereby movement of the float effects registry upon the dial.

4. In a liquid level indicator for tanks, a float, a guide rod extending from the center point of the bottom through the center of the tank vertically upwardly to a point adjacent the top thereof, said guide rod being adapted to direct the movement of the float, a bracket secured to the side wall of the tank, and a rod pivoted to said bracket, a sleeve secured to the float, said rod being slidable into said sleeve, an arm having a joint at one end thereof by which it is connected to said rod, said joint permitting universal movement and adjustability between the rod and the arm, said arm having at its opposite end a universal connection, an indicating mechanism to which said last universal connection is attached, whereby movement of the float is transmitted through the system to cause registry upon the indicating mechanism.

5. In combination with a tank having a filling opening, a liquid level indicator having indicating means mounted in the wall of the filling opening, a float, a guide rod for the float mounted within the tank and to one side of the filling opening, said guide rod extending from the center point of the bottom through the center of said tank to a point adjacent the top thereof, a bracket secured to a portion of the tank in spaced relation to the guide rod, and means connecting the float and the indicating means including an arm consisting of two telescopically engaging members connecting the float and bracket, and a rod having one end adjustably connected to the arm and having its other end connected to the indicating means, said rod being provided with universal joints to accommodate for offset relation between the float and the indicating means.

In testimony whereof I affix my signature.

ANDREW A. KRAMER.